United States Patent [19]

Meno

[11] Patent Number: 4,694,279

[45] Date of Patent: Sep. 15, 1987

[54] VECTOR ELECTRONIC CONTROL DEVICE

[75] Inventor: Frank Meno, Pittsburgh, Pa.

[73] Assignee: University of Pittsburgh, Pittsburgh, Pa.

[21] Appl. No.: 920,123

[22] Filed: Oct. 17, 1986

[51] Int. Cl.[4] .............................................. H03M 1/00
[52] U.S. Cl. ................................. 340/347 P; 307/116; 324/60 C; 340/365 C
[58] Field of Search .......................... 273/85 F, 85 G; 307/116; 318/662; 324/60 C; 328/5; 340/347 P, 347 DA, 347 AD, 365 C

[56] References Cited

U.S. PATENT DOCUMENTS

| | | | |
|---|---|---|---|
| 3,809,395 | 5/1974 | Allison, Jr. et al. | 273/1 E |
| 3,969,595 | 7/1976 | Johnson | 200/5 A |
| 4,103,252 | 7/1978 | Bobick | 331/48 |
| 4,167,697 | 9/1979 | Gerber | 324/60 C |
| 4,177,421 | 12/1979 | Thornburg | 324/61 R |
| 4,190,834 | 2/1980 | Doornink | 340/709 |
| 4,221,975 | 9/1980 | Ledniczki et al. | 307/116 |
| 4,304,406 | 12/1981 | Cromarty | 273/186 R |
| 4,305,007 | 12/1981 | Hughes | 307/116 |
| 4,323,829 | 4/1982 | Witney et al. | 307/116 X |
| 4,353,552 | 10/1982 | Pepper, Jr. | 273/85 G |
| 4,364,047 | 12/1982 | Archer | 340/870.37 |
| 4,405,918 | 9/1983 | Wall et al. | 340/365 C |
| 4,437,008 | 3/1984 | Matsuda et al. | 250/396 R |
| 4,459,578 | 7/1984 | Sava | 338/128 |
| 4,567,479 | 1/1986 | Boyd | 340/709 |

Primary Examiner—William M. Shoop, Jr.
Assistant Examiner—Richard K. Blum
Attorney, Agent, or Firm—Arnold B. Silverman

[57] ABSTRACT

An electronic control device for providing control signals having direction and magnitude represented by electrical output signals based upon employing a circuit that senses relative changes in capacitance with a few volt excitation at suitable frequency. A finger touch unbalances the equilibrium between a pair of capacitance electrodes which by means of the circuitry selectively produces signals representative of magnitude and direction, and whose rate is proportional to the degree of unbalance, and which signals are used for vector control purposes. The electrodes are positioned in a recessed slot in an encasement, which slot is accessible by fingers, and which pair of capacitance electrodes is protected by a dielectric layer.

12 Claims, 3 Drawing Figures

VECTOR ELECTRONIC CONTROL DEVICE

BACKGROUND OF THE INVENTION

1. Field of the Invention

This invention relates to an electronic control device and its circuitry for providing control values, particularly, control values having direction and magnitude, and more specifically, it relates to improvements in electronic control devices employing capacitive electrodes, shaped so that the capacitance is proportional to the area or distance effectively changed when a conducting member is positioned adjacent to the electrodes and moved from one position to another with respect to the electrodes.

2. Description of the Prior Art

There are many types of electronic control devices for generating and translating positional information into electrical signals. An example of an application for these electrical signals is a cursor control device which may be used in visual display apparatus such as those used in text editing or in video games based upon a circuitry with one or two dimensional implementation. A cursor can be controlled in both ways, line by line, or in graphics in two dimensions. One or two dimensional implementation in control devices is also presently known which functions electronically as a mechanical "joystick" which generally is a pivoted mechanical lever or control member with freedom of movement in a 360 radius, and which device is used in conjunction with controlling quadrophonic sound systems, video games, or vehicles, such as aircraft and boats.

The prior art has generally described positional indicator devices with two dimensional implementation and operated through the employment of a mechanical joystick. Illustrative are U.S. Pat. Nos. 4,190,834; 4,305,007; 4,364,047; and 4,459,578. The electronic circuitry of the prior art may employ capacitative effect components, or registers and counters in a logic circuit, or the Hall Effect with the intended purpose for direction control. In most of these examples, the displacement of the joystick generates two electrical signals representative of cartesian x, y values.

Since these mechanical joystick devices hereinbefore described employ moving parts, they are susceptible to wear, inaccuracies due to misalignment of components, or mechanical limitations, and/or slow response time. Another problem is the tendency to inadvertently activate the control system due to the generally upright positioning of the joystick member.

To reduce, if not eliminate, the impact of these disadvantages, ideally there must exist an electronic position indicating device which is essentially electrical not requiring any moving parts. Such a device may be controlled by a finger touch panel, for example.

The prior art has also shown a finger touch panel for position control with two dimensional implementation. Illustrative is U.S. Pat. No. 4,177,421 where a finger touch control panel comprises two or more capacitive transducers to as an x-y position indicating control. Also illustrative is U.S. Pat. No. 4,103,252 which device functions on the principle of variable capacitance caused by finger movement on the surface of the device in proximity to a plurality of capacitor plates. These devices have no moving mechanical parts, but require sophisticated electronic circuitry for sensing the variance of capacitance to provide signal outputs representative of x, y position coordinates.

There is therefore lacking in the prior art a teaching of a generally total electronic device with finger sensitive control adaptive for versatile use in video, sound, and vehicle control systems. There is further lacking such a device containing a simple inexpensive electronic circuitry employing capacitive effect for producing electrical outputs representative of direction and magnitude for position of a control member. There is further lacking in the prior art a one dimensional finger sensitive control panel which cannot inadvertently be contacted, and activating the electronic circuitry or control system. There is further lacking in the prior art finger sensitive control means employed in an inexpensive, yet extremely rugged enclosure carrying the electronic circuitry and manufactured in a variety of shapes and sizes for specialized uses. There is further lacking a positional control device which is not easily affected by acceleration or vibration occurring in the system.

SUMMARY OF THE INVENTION

The present invention has solved the above described problems by providing a rugged, inexpensive control device not requiring any moving mechanical electronic systems controlled in the past by mechanical joysticks or finger sensitive panels. Sensitive control panel means which are responsive to finger position operate a simple electronic circuit which is capacitance effected for generating signals representing both direction and magnitude in one dimension.

In the preferred embodiment of the invention a pair of tapered electrodes each forming a capacitor are ambushed in slots of a grounded enclosure of the device. The slots are generally accessible by a control member such as the human finger. The electrodes are shaped so that the capacitance of each electrode is proportional to the surface of the electrode contacted by the control member, and the value of the capacitance is changed as the finger moves in various positions over the surfaces of the electrodes.

An electronic circuit of the invention senses the relative changes in capacitance with a few volt excitation at a frequency of approximately 100 KHz, for example. Several output signals are produced by the circuitry when a control member either touches and/or touches and moves over the surface of the electrodes in that an unbalance is created thereby disturbing the equilibrium of the electrical field existing in the electronic control device. The amplitude of the signals is proportional to the degree of unbalance, and thus, is used for control purposes. In a preferred embodiment at least three output signals are generated: a binary (two voltage level) signal representing direction; an analog signal representing magnitude of the displacement; and a digital signal representing the magnitude of the displacement.

It is an object of this invention to provide a relatively maintenance free, inexpensive electronic control device for controlling position which is difficult to activate unintentionally, easy to manufacture in a variety of sizes and shapes for different uses, and suitable for developing into an integrated circuit.

It is a further object of the invention to provide an electronic control device for positional control with capacitive effective circuitry and having means for changing the capacitance and for detecting such capacitance variations.

It is a further object of the invention to provide an electronic circuitry for a positional control device which is capacitance effective.

It is a further object of the invention to provide an electronic circuitry for a positional control device producing output signals for direction and magnitude and being one dimensionally implemented.

It is a further object of the invention to provide an electronic control device for positional control with electronic circuitry which produces signals representing direction and magnitude in at least one dimension and adapted for use for two or three dimensions upon combining two or three one dimensional control circuits.

It is a further object of the invention to provide electronic circuitry including means for providing voltage output signals some of which are representative of the magnitude of a change in capacitance, which signals are transformed for input into a digital and an analog device.

It is a further object of the invention to provide a control device, replacing mechanical joysticks of finger sensitive panels, which may be used in systems such as sound, video, or computers, aircrafts, boats, wheelchairs, vehicles, water level, accelerometer, etc.

These and other objects of the invention will be more fully understood from the following description of the invention and reference to the illustrations appended hereto.

DESCRIPTION OF A PREFERRED EMBODIMENT

Figure 1:
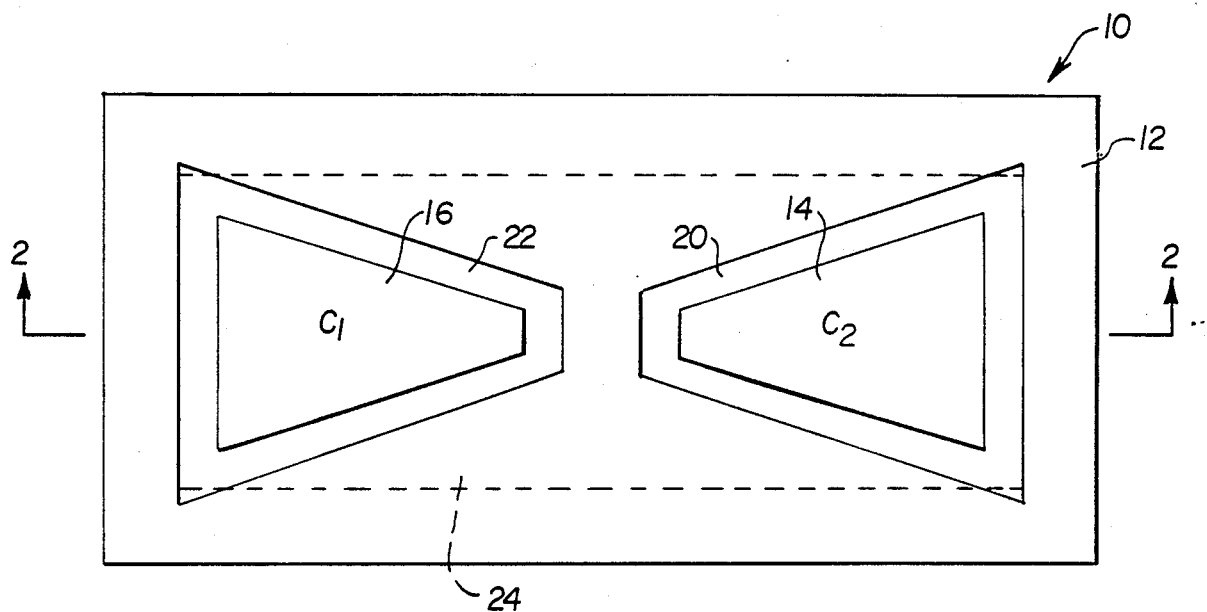
FIG. 1 is a top plan view of the device of the present invention.
Figure 2:
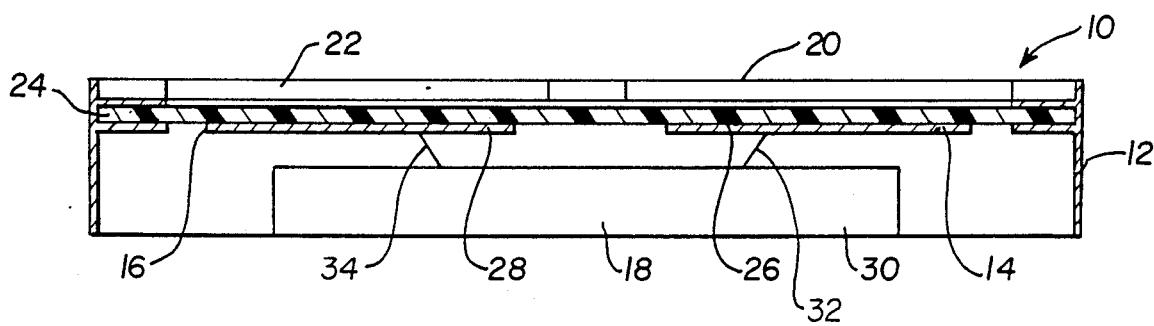
FIG. 2 is a cross sectional view taken along lines 2—2 of FIG. 1.
Figure 3:
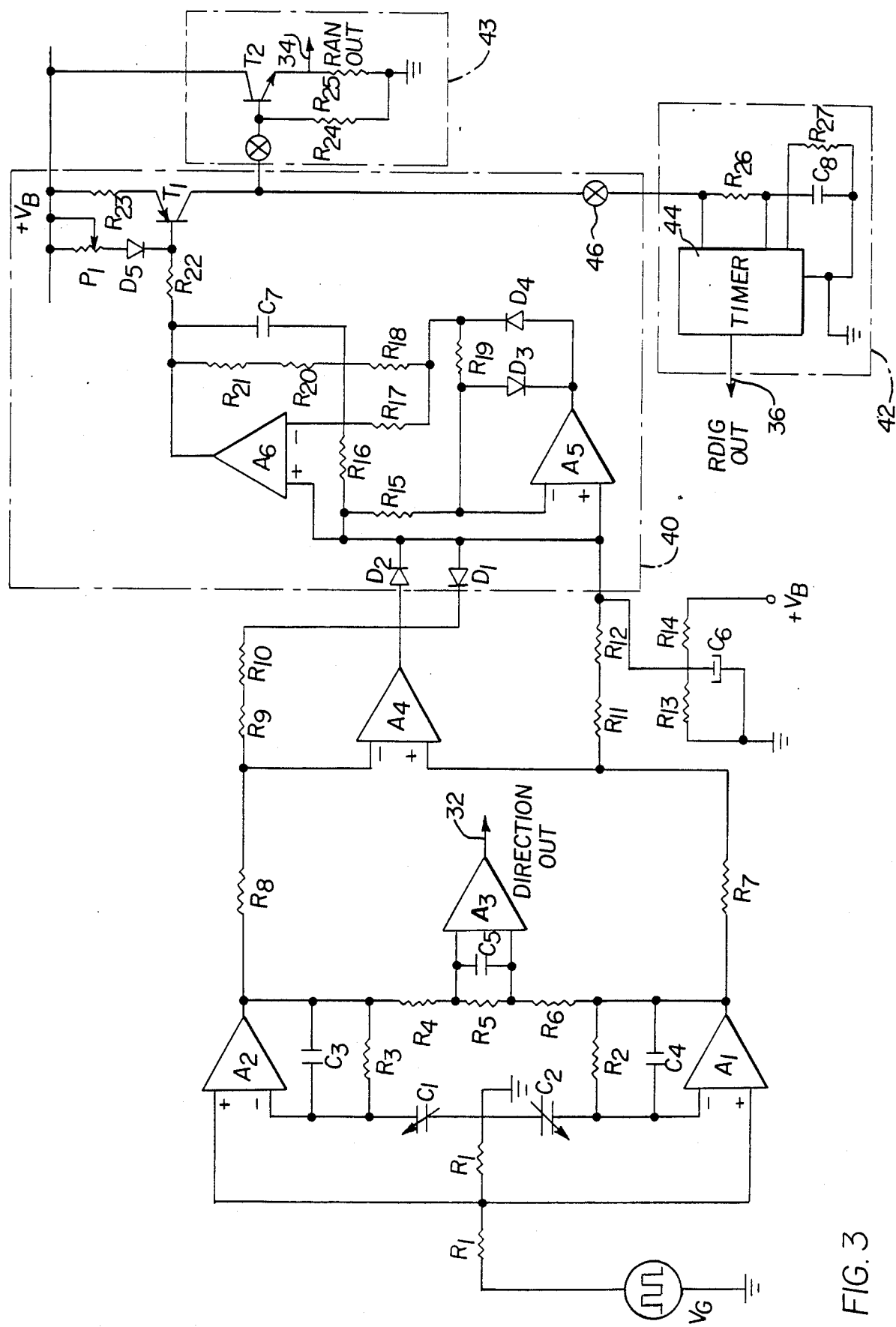
FIG. 3 illustrates a circuit diagram suitable for use in the present invention.

FIGS. 1 and 2 illustrate the arrangement of capacitors $C_1$ and $C_2$ in an electronic control device 10, and FIG. 3 shows the circuitry contained in control device 10. Control device 10 consists generally of a rectangular housing or outer casing 12 which is made of a durable electrically conducting material such as metal, and contains the electrode plates 14, 16 of capacitors $C_1$ and $C_2$ respectively mounted on the insulating layer 24, and the electronic circuitry 18 of FIG. 3. The electrode plates 14 and 16 may be metal and insulating layer 24 may be of a transparent plastic material. Two generally triangularly shaped slots 20 and 22 in top surface of control device 10 permit the electrodes 14, 16 to be recessed, and provide access thereto by a control member such as a human finger or foot. Control device 10 can be made large enough so that it can be operated by a foot, and the hand or foot does not have to be bare for its operation, i.e. shoes or gloves will not prevent activation of device 10.

As particularly shown in FIG. 1 located between the bottom of slots 20 and 22 and the electrodes 14 and 16 of capacitors $C_1$ and $C_2$ is a thin dielectric insulation layer 24 which generally extends to cover, protect and/or carry the electrodes 14 and 16 in slots 20 and 22. As can be seen in FIG. 2 electrodes 14 and 16 are supported by a recessed surface 26, 28 of casing 12, which casing 12 contains a lower cutout 30 for holding electronic circuit 18 to which electrodes 14, 16 are electrically connected by lines 32, 34. Layer 24 also aids in completing the forming of capacitors $C_1$ $C_2$ towards the ground plane when a control member touches the insulation layer 24. In this respect, the control member upon contact with the insulation layer 24 is capacitively coupled to the electrodes 14 and 16. When finger or foot contact is made a portion of the applied AC voltage is shunted to ground via the operator's body. The amount of shunting is dependent on the distance of the finger from the layer 24 as well as the total area of the finger or fingers contacting the layer 24, given by the formula $C=KA/d$, where K is the dialectric constant of the material, A the contact area and d the distance. The capacitive coupling and shunting by the human body is further taught in U.S. Pat. No. 4,177,421 incorporated herein by reference.

In the preferred embodiment, electrodes 14 and 16 are triangularly shaped and correspondingly fit into the slots 20 and 22. The capacitance of each electrode 14, 16 is proportional to its total area. This particular configuration for electrodes 14 and 16 implemented on a printed circuit is such that the value for the capacitance is effectively changed as the control member moves from one position to another over electrodes 14 and 16. A similar effect could be achieved by varying the thickness or the dielectric constant of the insulation material 24, as evident from the above formula. Also, varying the area of the electrodes 14, 16 will change the value of the capacitance. If desired, a portion of the electrodes 14, 16 can be manufactured out of a transparent material such as used in liquid crystal display (LCD) devices.

As hereinbefore mentioned, electrodes 14 and 16 are respectively recessed in slots 20 and 22 in the housing which is at ground potential, thus providing both a common reference voltage and shielding for the electrodes 14 and 16 as particularly shown in FIG. 1.

Referring again to FIG. 3 the electronic circuitry will now be explained further.

The circuitry shown in FIG. 3 of the drawings is designed to produce an analog voltage output at the terminal 34 designated as RAN output, and a digital output at the terminal 36 legended as RDIG output for amplitude and rate control respectively. The output 32 determines the direction, and specifies whether $C_1$ or $C_2$ has been touched.

The input excitation in the circuit of the FIG. 3 is provided by the electrical constant voltage and constant frequency generator VG. The amplifiers $A_1$ and $A_2$ receive the signal through the voltage divider consisting of the resistors $R_1$. To the far left of FIG. 3 associated with the capacitors $C_1$ and $C_2$ are equivalent operational amplifiers $A_1$ and $A_2$; two equivalent resistors $R_1$, equivalent resistors $R_2$ $R_3$, and equivalent capacitors $C_3$ and $C_4$. The DC gain of amplifiers $A_1$, $A_2$ is unity, given by:

$$(1+R2/\alpha)=1; \tag{1}$$

Whereas the AC gain for amplifier $A_1$ is given as:

$$[1+C_1/(C_3-j/2\pi fR_3)] \tag{2}$$

where $j=\sqrt{-1}$ and f is frequency, and the AC gain for amplifier $A_2$ is given as:

$$[1+C_2/(C_4-j/2\pi fR_2)]. \tag{2a}$$

From this aforesaid formula, it follows that if f or $R_2$ and $R_3$ are large, the AC gain approaches the value $(1+C_1/C_3)$, and $(1+C_2/C_4)$ respectively. If $C_3$ and $C_4$ are chosen to be very small at approximately 1 to 2 $_pF$ and $C_1$ and $C_2$ are larger than 1 to 2 $_pF$, the gain is larger than 2. In this manner, the output voltage of amplifiers $A_1$ and $A_2$ for a constant AC input voltage VG for the remaining components of the circuitry, will be proportional to $C_1$ and $C_2$ which, in turn, is proportional to the area of electrodes 14, 16 covered by the finger or fingers contacting dielectric layer 24. In general, $$C = Area \times dialectric\ constant/separation. \quad (3)$$

With regard to Equation 2, for a typical frequency of 100 KHz, and $C_3=C_4=2\ _pF$, and $R_2=R_3=20$ M ohms, the AC gain becomes about $[1+C_1(2\times10^{-12}-j\times10^{-13})]$. Thus, if $C_1$ varies from $2\times10^{-12}$ to $100\times10^{-12}$, a factor of about 50 in voltage outputs of $A_1$ and $A_2$ is achieved. These outputs are fed through resistors $R_4$, $R_5$, $R_6$ to the input of operational amplifier $A_3$. $R_4$ and $R_6$ are equal.

Operational amplifier $A_3$ serves as a comparator for capacitors $C_1$ and $C_2$. Thus, the output for $A_3$ is derived from or depends on the difference in the electrical capacitance between $C_1$ and $C_2$. This signal, as indicated in the circuit, represents direction, and as indicated above, depends upon the position of the finger on capacitors $C_1$ or $C_2$.

Capacitor $C_5$ associated with amplifier $A_3$ serves to filter out noise so that the directional signal, direction out responds only to actual changes at the inputs to amplifiers $A_1$ and $A_2$ and not to the surrounding rippling effects from the other electrical components.

The voltage outputs from amplifiers $A_1$ and $A_2$, in addition to being fed to amplifier $A_3$ are also fed to amplifier $A_4$ through resistors $R_7$, $R_8$, $R_9$, $R_{10}$, $R_{11}$, $R_{12}$. Amplifier $A_4$ serves as a difference amplifier with a gain of 2 determined by resistors $R_7$ through $R_{12}$, all of which have the same resistance value.

Amplifier $A_4$ acts to cancel the common inputs from $A_1$ and $A_2$ and amplifies only the difference therebetween. Therefore, the total gain at the output of $A_4$ is approximately:

$$2\times[(1+C_1/C_3)-(1+C_2/C_4)]=2(C_1-C_2)/C_3 \quad (4)$$

where $C_3=C_4=$constant. Thus, when $C_1=C_2$, the output signal is zero.

Resistors $R_{13}$, $R_{14}$ are equal in value and provide a bias voltage to the amplifiers in the circuit, while capacitor $C_6$ serves to stabilize this voltage.

The voltage output of $A_4$ with a gain of 2 is coupled through diodes $D_1$, $D_2$ into a full wave operational rectifier which is block outlined and identified as 40 in FIG. 3. Diode $D_2$ allows the positive portion of oscillatory voltage to pass through and Diode $D_1$ allows the negative portion to pass through into the operational rectifier, which consists of operational amplifiers $A_5$ and $A_6$; diodes $D_3$, $D_4$; resistors $R_{15}$, $R_{16}$, $R_{17}$, $R_{18}$, $R_{19}$, $R_{20}$, $R_{21}$; and filter capacitor $C_7$. Diodes $D_1$, $D_2$ also provide a noise threshold at the input to the operational rectifier 40.

The signal from rectifier 40 through resistor $R_{22}$ is coupled to the base of transistor $T_1$ located toward the upper right hand side of FIG. 3. The biasing of $T_1$ is determined by diode $D_5$ and potentiometer $P_1$, while resistor $R_{23}$ limits the current through transistor $T_1$. Transistor $T_2$ serves as an emitter follower to provide over resistors $R_{24}$ and $R_{25}$ a voltage proportional to the change in the electrical capacitance in capacitors $C_1$ and $C_2$ as a result of the positioning or change in positioning of the control member over dielectric layer 24. This voltage signal designated as RAN OUT appearing in block 43 can be used to control devices requiring analog inputs.

The lower right hand portion of the circuit in block outline form identified by numeral 42 provides digital signal or devices requiring a digital input. The digital signal frequency as output from block 42 represents a magnitude proportional to the changes in capacitors $C_1$ and $C_2$.

The signal from collector transistor $T_1$ is fed to a timer 44 connected in the circuit to act as a current controlled pulse generator. Timer 44 provides a pulse train whose frequency varies from 0 to typically a few thousand hertz depending on the changes of the input capacitances to capacitors $C_1$ and $C_2$ as a result of the positioning of the finger over the electrodes 14 and 16. Resistors $R_{26}$ and $R_{27}$ and capacitor $C_8$ determine the timing relationships of the pulse train.

Typical component values are $R_1=10K$ ohm
$R_2=R_3=20$ M ohm
$R_4$ to $R_{12}=R_{15}$ to $R_{22}=100K$ ohms
$R_{13}=R_{14}=R_{25}=1K$ ohms
$R_{23}=R_{24}=R_{26}=20K$ ohm
$R_{27}=1$ M ohm
$C_1=C_2=2$ to 100 pF
$C_3=C_4=2$ pF
$C_5=C_7=0.1\ \mu F$
$C_6=100\ \mu F$
$C_8=0.01\ \mu F$ Referring again to FIGS. 1 and 2, the electronic control device 10 is a grounded enclosure with a casing 12 which separates electrodes 14 and 16 from the circuits generally indicated at 18.

Casing 12 is also provided with access openings 44, 46 serving to provide paths for power and outlet leads.

Electronic device 10 described in FIGS. 1, 2 and 3 functions as a means to control direction and magnitude in one dimension. It is apparent that two and three such devices could be implemented to correspondingly control two and three dimensions. Also, one or more fingers or a foot can be used to change the capacitance of electrodes $C_1$ and $C_2$.

In summary, it will be appreciated that the present invention has provided generally triangularly shaped electrodes in an electrically insulated and shielded encasement containing the electronic circuitry. The encasement is generally rectangular having a dimension of approximately 5 inches wide and 5 inches long. The change in capacitance is achieved by a conducting member, such as a finger.

Control device 10 with electrodes 14 and 16 can be made in a variety of sizes and shapes where the electronic circuitry can be made to be an integrated circuit etched on a chip and the electrodes can be etched on a printed circuit.

The geometry of the electrodes can also vary in various ways from what is shown, however, they must have an area or distance such that it will change the capacitance upon contact. The two sensing electrodes may also be placed in a single slot, merely separated by a distance. Other geometric shapes include circles, rectangles, parallelograms, etc. Other conducting members, such as metal plates or liquid conductors including mercury can be used in place of the finger or foot. Compression of an elastomer or any other means to vary capacitance is envisioned as possible implementation.

Whereas particular embodiments of the invention have been described above for purposes of illustration, it will be evidence to those skilled in the art that numerous variations of the details may be made without departing from the invention as defined in the appended claims.

I claim:

1. In an electronic device for generating at least two interrelated electrical outputs, comprising:
    at least two capacitive sensing means each for establishing a capacitor with a grounded electrical conductor positionable to conduct a capacitance when said conductor contacts said sensing means, and said sensing means having a configuration such that its capacitance changes as the position of said grounded conductor changes;
    a first generating means for generating a first electrical output of selected characteristics and strength in response to said change in capacitance imposed upon one or both of said sensing means including a difference determining means for deriving the difference in capacitance between said two sensing means, and said first electrical output representing this difference and defining the direction of the displacement of said grounded conductor on one or both of said sensing means; and
    a second generating means for generating a second electrical output of selected characteristics and strength in a response to said change in capacitance imposed upon one or both of said sensing means, including a deriving and amplifying means for deriving and amplifying the difference in capacitance between said two sensing means; and
    rectifying means for receiving said second electrical output and for generating a third electrical output defining the magnitude of said displacement of said grounded conductor on said one or both sensing means, whereby upon relative positioning and movement of said grounded member, the direction and magnitude of said output signals may be established.

2. In a device of claim 1, including first converting means for receiving and converting said third electrical output into a digital output signal.

3. In a device of claim 1, including second converting means for receiving and converting said third electrical output into an analog output signal.

4. In a device of claim 1, inluding selective converting means for receiving and selectively converting said third electrical output into a digital output signal or an analog signal.

5. In a device of claim 1, wherein said two sensing means consists of a pair of cooperative electrodes, and further comprising:
    a grounded encasement having recessed slot means located in a top surface thereof; and
    wherein said two sensing means consist of a pair of cooperative electrodes, each arranged in said slot means and a dielectric layer substantially covering said electrodes, whereby said grounded conductor has access for contact with said dielectric layer through said slot means.

6. In a device of claim 5, including said electrodes having a configuration such that displacement of said grounded conductor over said dielectric layer changes the capacitance of said electrodes.

7. In a device of claim 5 including saod electrodes being generally triangular in plan and arranged along a longitudinal axis of said encasement in said slot means so that displacement of said grounded conductor over said dielectric layer changes the capacitance of said electrodes.

8. In a device of claim 5, including electronic circuit means comprising at least said first and second generating means and said rectifying means; and
    said encasement having means for carrying said electronic circuit, and includes means for electrically insulating and separating said electronic circuit from said electrodes.

9. In a device of claim 1, including said first generating means consisting of a first and second equivalent operational amplifier means, each for detecting the change in the capacitance of its associated sensing means, and each said amplifier having an AC gain.

10. In a device of claim 9, including a third operational amplifier means for receiving and comparing said AC gain signals of said first and second operational amplifier means and producing said first electrical output for said definition of said direction.

11. In a device of claim 9, including said two sensing means being an electrode designated as $C_1$, $C_2$ and first and second amplifier means associated with a different one of said electrodes, and each consisting of a capacitor $C_3$, $C_4$, respectively, and a resistor $R_2$, $R_3$, respectively, whereby said AC gain signal of said first amplifier is controlled by the equation:

$$[1+C_1/(C_3-j/2\pi f R_3)]$$

where $j=\sqrt{-1}$ and f is the frequency in said device, and said amplifier is controlled by the equation;

$$[1+C_2/(C_4-j/2\pi f R_2)]$$

where $j=\sqrt{-1}$ and f is the frequency in said device.

12. In a device of claim 10, including said two sensing means being an electrode designated as $C_1$ and $C_2$ respectively and said first and second amplifier means associated with a different one of said electrodes, and consisting of a capacitor $C_3$ and $C_4$ respectively, whereby said AC gain signal of said third operational amplifier means is controlled by the equation $$2\times[(1+C_1/C_3)-(1+C_2/C_4)]=2(C_1-C_2)/C_3,$$

where $C_3=C_4=$ constant.

* * * * *

UNITED STATES PATENT AND TRADEMARK OFFICE
CERTIFICATE OF CORRECTION

PATENT NO. : 4,694,279

DATED : September 15, 1987

INVENTOR(S) : FRANK MENO

It is certified that error appears in the above-identified patent and that said Letters Patent is hereby corrected as shown below:

Column 1, line 39, "capacitative" should be --capacitive--.

Column 6, line 10, "or" should be --for--.

Claim 4, column 7, line 56, "inluding" should be --including--.

Claim 7, column 8, line 13, "saod" should be --said--.

Signed and Sealed this

Eighth Day of November, 1988

Attest:

DONALD J. QUIGG

*Attesting Officer*  *Commissioner of Patents and Trademarks*